Sept. 5, 1939.   F. C. WERNER   2,172,148
COOKY ROLLER CONSTRUCTION
Filed Feb. 23, 1939
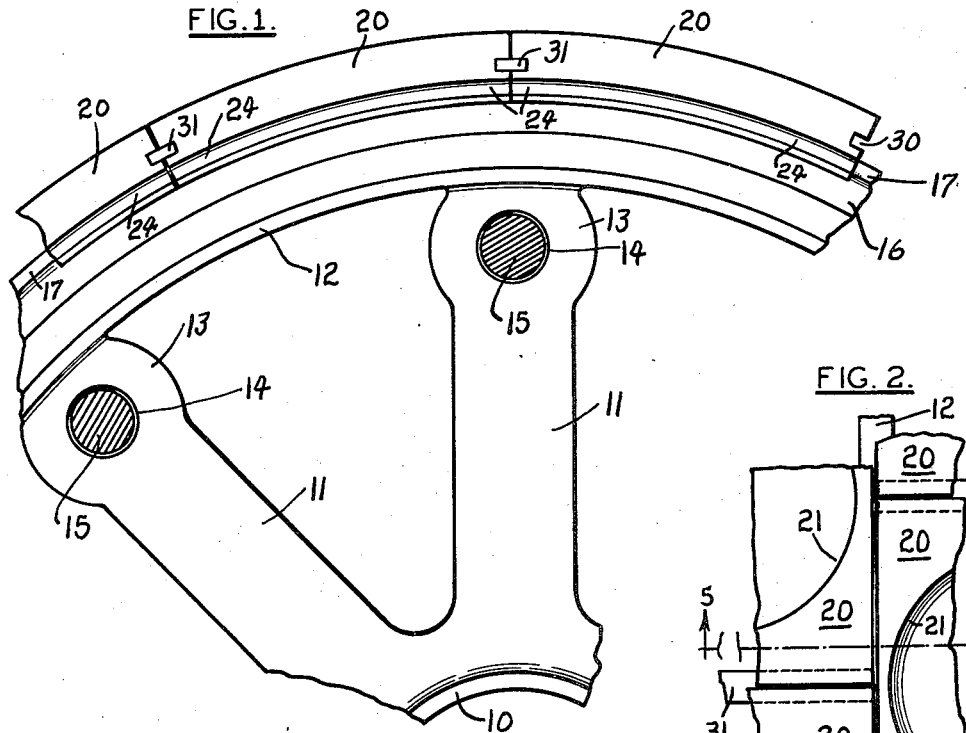
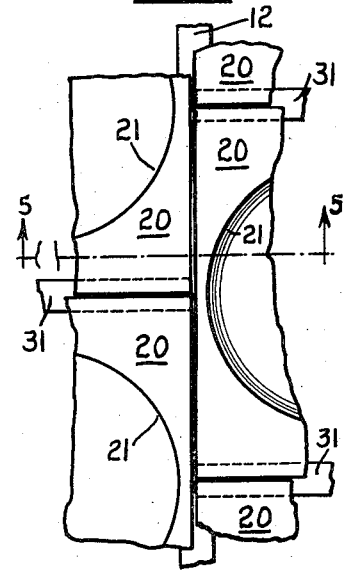
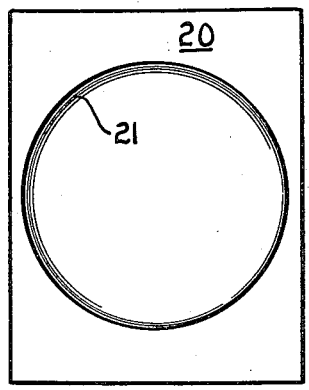
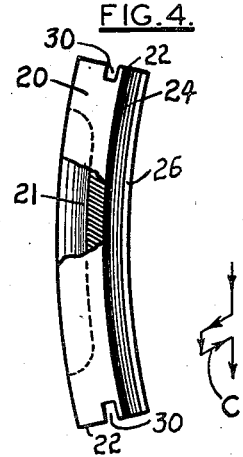
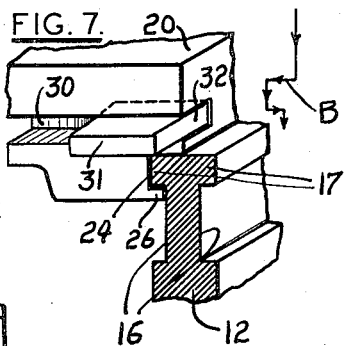
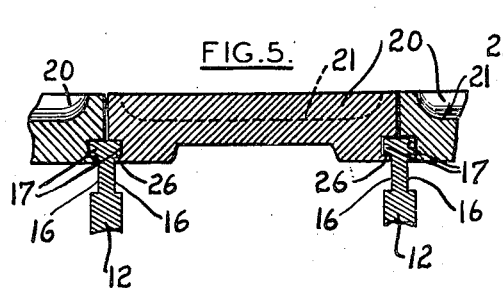
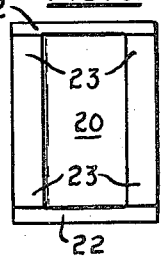
Inventor
FRANK CHARLES WERNER
By Thomas G. Boman
Attorney Patented Sept. 5, 1939

2,172,148

UNITED STATES PATENT OFFICE 2,172,148

COOKY ROLLER CONSTRUCTION

Frank Charles Werner, Grand Rapids, Mich.

Application February 23, 1939, Serial No. 257,786

11 Claims. (Cl. 107—8)

My invention relates generally to cooky roller construction and more particularly to interlocking means for aligning, sealing, reinforcing and securing the many blocks or dies, these forming the outer surface of the finished roller, together in their correlated positions.

One of the very grave difficulties of constructions of this character, as now constructed, is that the grease from the cooky dough, or the dough itself, works through the junctures between the ends of the several die segments or blocks and gradually accumulates upon the inside of the roll. And of course this is very unsanitary and objectionable as it works back out into the dough and fouls and spoils the same. Also, it produces bad odors. One present remedy is to frequently remove the roller from the machine and subject it to interior steam pressure in order to try to force these spoiled ingredients from the many crevices.

One of the main objects of my invention is the elimination of this difficulty by preventing the entry of these doughs and the like between the ends of the blocks. In this regard, it will be realized that these contacting ends of the blocks are located along radial planes and thus are difficult to machine to a perfect fit. In my invention, the sealing strip prevents downward passage of grease and dough by virtue of its snug fit with the sealing groove, this novel construction not only forming a tortuous passage for the dough but also substantially preventing its passage inasmuch as the strip and its receiving groove present no substantial machining difficulties and consequently a perfect fit may be had.

Another feature along this same line lies in the fact that the sealing strip alines and holds the two adjacent blocks in strict alinement whereby movement therebetween is very materially lessened and thus the filler, as solder, if used, is not subjected to twisting and wiggling strains which break and loosen and destroy it.

Another very decided advantage, especially desirable in view of present day competition, resides in the fact that my construction does not need to have its ends so precisely machined as to prevent or tend to prevent the passage of dough thereby. My sealing strip, in itself, takes care of this condition.

And, if desired, the grooves which receive the sealing strip may virtually approach the concentric circle of the roller whereby the entry of the straight strip causes a minute bowing of the strip and a corresponding reaction in the blocks whereby their outer edges closely approach one another and thus prevent the entry of foreign matter therebetween.

Further objects, and objects pertaining to the details and economies of construction and operation of my invention will definitely appear from the detailed description to follow.

In the drawing—

Fig. 1 is a fragmentary side view of one of the eight or ten or more or less supporting wheels or rings which carry substantially the same number of complete circumferential rows of cookie forming dies or blocks, each row having, as indicated, thirteen blocks or dies.

Fig. 2 is a fragmentary plan view of the surface of the roller construction.

Fig. 3 is a top or plan view of one of the die blocks.

Fig. 4 is a side view of Fig. 3, a portion being broken away in order to expedite the showing.

Fig. 5 is a sectional view taken along the line 5—5 of Fig. 2.

Fig. 6 is an underplan view of a single block prior to the forming of the several grooves therein.

Fig. 7 is a perspective view illustrating the manner of joining the several elements.

As shown in Fig. 1, numeral 10 indicates the hub of a supporting wheel which has spokes 11 formed integral with the rim 12. The spokes 11 are broadened at 13 to permit holes 14 to be formed therein. Rods 15, shown in cross section, extend through the several wheels to hold them in parallel position.

The rims 12, see Figs. 5 and 7, are thinned and faced at 16 to form parallelly located surfaces at right angles to the axis of the roller, then extended concentrically and axially to form flanges 17.

As shown in Fig. 2, the outer face or surface of the roller is formed of a plurality of die blocks 20. Each of these blocks 20, see particularly Figs. 3, 4 and 5, has the desired impression formed or cast therein.

As shown in Fig. 6, the ends of the block are beveled or formed at an angle as shown at 22. Lugs or bosses 23 extend downwardly from the sides thereof.

As clearly shown in Figs. 1 and 4, the blocks are curved about one dimension to fit about the rims 12 of the supporting wheels. Grooves 24, see Fig. 4, are cut through the outer faces of the lugs 23, the radius of these grooves being the same as that of the flanges 17 whereby the flanges may be received therein. There is one groove on each side of the block.

This construction uses a minimum of metal. That is, the thickness of the entire block is materially cut down without sacrificing a proper interlocking side joint construction and seal.

As shown in Fig. 7, the groove 24, where it passes through the lugs 23, receives the flange 17 so as to encircle the same on three sides thereof, and also the lip 26 abuts the flat surface 16 previously referred to. The path through this interlock is indicated by the arrow B.

The die blocks 20 have kerfs or slots 30 at either end thereof, these kerfs being located between the plane of the slots 24 and the outer face of the block. These kerfs 30 extend inwardly toward the cut away die recess but the block is made sufficiently long to prevent these kerfs from entering these recesses 21. These kerfs 30, as shown, are of rectangular configuration in cross section and extend inwardly at right angles to the end faces 22, see Fig. 6, of the die blocks. However, if desired, these slots may be made to extend more or less around the concentric circle passing through their mouth or outer opening whereby the sealing strip tends to spring the outer edges of the blocks tightly together. The sealing strips are numbered 31, see Figs. 1, 2, and 7, and tightly fit into the sealing grooves. Their length is such as to extend across the ends of the blocks. They may abut the adjacent blocks inasmuch as the blocks are staggered. See Fig. 2. In Fig. 7, numeral 32 indicates the abutting end of the sealing strip.

After the sealing strip 31 is in place, the dough or grease must travel the circuitous path indicated by the arrow C before it can enter the interior of the roller. As a matter of fact, due to the tight fit possible around the sealing strip, it does not pass the same.

Another form of construction is that having the strip integrally cast or formed as one with one of the blocks and the adjacent block being grooved to receive the same.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is—

1. An article of manufacture comprising a unit cooky block of rectangular shape curved to fit around a cylinder, the concave side having two bosses at its curved sides extending inwardly therefrom, grooves extending through the flat side faces of the side bosses, these grooves extending circumferentially to the said cylinder and being radially positioned so as to be closely adjacent the inner face of the cooky block, said block also having an end groove positioned between the plane of the top of the block and a concentric plane through the side grooves, this end groove being substantially parallel to the upper face of the block and extending completely across the end of the block for the purpose described.

2. In combination, a plurality of die blocks located in circumferential rings, a first means holding the blocks of each ring in their respective positions, and a second means located between the abutting ends of the several blocks, said second means including means formed of strip metal which seals the groove and completely across the width of the block, said adjacent blocks having opposed grooves to receive the second means, the faces of the blocks both above and below the groove being very closely positioned to each other.

3. In a roller construction of the class described, a plurality of spaced supporting wheels, each wheel being axially flanged at its periphery, impression segments of general rectangular shape, said segments being curved cylindrically to match the outer portions of the wheels, said segments having circumferential grooves along their curved sides, the flanges of the opposed adjacent wheels entering these grooves, whereby circumferential rows of segments are formed, the abutting ends of the segments being radially faced, one of each of these corresponding faces having a groove extending inwardly therefrom, and means associated with each of the said grooves and the adjacent block whereby dough or grease is prevented from passage therethrough.

4. A unit impression block of the class described comprising a concave-convex block, with respect to one dimension, of rectangular shape, flat sides, and ends cut at right angles to the curvature of the block, lugs formed on the concave side of the block, grooves along the sides, these grooves passing partly through the lugs and partly through the main body of the block, and a groove across one end of the block, this latter groove being located between the lugs and the top face of the block.

5. A roll of the kind described embodying therein a plurality of arcuate block-like die members having side and end edges and arranged side by side and end to end to form a curved multiple die, each die member having a groove in one of its edges and a groove in one of its ends, said grooves being located in different planes.

6. In combination with a ring having an outer face and a pair of laterally oppositely extending axial flanges, a plurality of arcuate block-like die members having side and end edges and arranged side by side and end to end to form a curved multiple die, each die member having a groove along each of its sides, said grooves being of such size as to receive said respective laterally extending axial flanges and permit the juxtaposition of the die members at their outer surface.

7. A combination of elements as set forth in claim 6 but also having sealing means for the ends of the said die members.

8. A combination of elements as set forth in claim 3 in which a plurality of means is provided for holding the spaced supporting wheels together.

9. A combination of elements forming a roller construction, comprising, a plurality of spaced supporting wheels, each wheel being axially flanged at its periphery, and having a concentric flat radial surface inside of said flange, impression segments of general rectangular shape, said segments being curved cylindrically to match the outer portions of the wheels, said segments having circumferential grooves along their curved sides, and surfaces inside of the said grooves, the flanges of the opposed adjacent wheels entering these grooves, whereby circumferential rows of segments are formed, the said surfaces inside contacting the said radial concentric flat surfaces, the abutting ends of the segments being radially faced, one of each of these corresponding faces having a groove extending inwardly therefrom, and means associated with each of the said grooves and the adjacent block whereby dough or grease or the like is prevented from passage therethrough.

10. In a built-up impression roller of the class described, a series of spaced supporting rings, a plurality of impression units and means for maintaining the units in cylindrical form upon the peripheries of said spaced supporting rings, with their ends in abutting relationship, said ends being grooved and said grooves being positioned outwardly with respect to the periphery of the said spaced supporting rings for the purpose described, strip means fitting the opposed grooves, and strip means sealably fitting the grooves which receive it.

11. A unit impression block of the class described comprising a concave-convex block, with respect to one dimension, of rectangular shape, flat sides, and ends cut at right angles to the curvature of the block, lugs formed on the concave side of the block, holding means on the sides, these holding means being positioned partly on the lugs and partly on the main body of the block, and a groove across one end of the block, this groove being located between the said means and the top face of the block.

FRANK CHARLES WERNER.

CERTIFICATE OF CORRECTION.

Patent No. 2,172,148.                                September 5, 1939.

FRANK CHARLES WERNER.

It is hereby certified that error appears in the printed specification of the above numbered patent requiring correction as follows: Page 3, second column, line 1, claim 10, for the word "and" read the; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.